United States Patent [19]
Huibers et al.

[11] Patent Number: 5,286,845
[45] Date of Patent: Feb. 15, 1994

[54] ACIDIFICATION OF TALL OIL SOAP USING CARBON DIOXIDE

[75] Inventors: Derk T. A. Huibers, Pennington, N.J.; James W. Gillis, Yardley, Pa.; Andrew Robbins, Trenton, N.J.

[73] Assignee: Union Camp Corporation, Wayne, N.J.

[21] Appl. No.: 886,654

[22] Filed: May 20, 1992

[51] Int. Cl.⁵ .................................................. B01D 17/06
[52] U.S. Cl. ............................. 530/208; 530/209; 530/230
[58] Field of Search ......................... 530/208, 209, 230

[56] References Cited

U.S. PATENT DOCUMENTS

| | | | |
|---|---|---|---|
| 1,888,581 | 11/1932 | Bent | 530/209 |
| 2,515,739 | 7/1950 | Smerechniak et al. | 530/209 |
| 3,901,869 | 8/1975 | Bills | 530/209 |
| 4,075,188 | 2/1978 | Vardell, Jr. | 530/209 |
| 4,495,095 | 1/1985 | Lawson et al. | 530/209 |

OTHER PUBLICATIONS

*Westvaco's Carbon Dioxide Process*, Feb. 28–Mar. 2, 1989, Charleston, S.C.

Smook, G. A., *Handbook for Pulp & Paper Technologists*, 6th Edition, 1989; pp. 146–148.

McSweeney, E. E., *Sulfate Naval Store*, (as reported in Naval Stores: Production, Chemistry, Utilization), pp. 165–168.

*Primary Examiner*—John Kight, III
*Assistant Examiner*—Richard Jones
*Attorney, Agent, or Firm*—William K. Wissing

[57] ABSTRACT

The present invention relates to the conversion of tall oil soap to produce crude tall oil. An aqueous tall oil soap solution generated in a kraft wood-pulping process is placed in contact with carbon dioxide, under pressure, to form crude tall oil and sodium bicarbonate brine. The crude tall oil and sodium bicarbonate brine are then allowed to separate, under pressure, into a crude tall oil layer and a sodium bicarbonate brine layer. The crude tall oil layer is then separated from the sodium bicarbonate brine layer, again under pressure. The separated crude tall oil may then be further refined to yield fatty acids, resin acids, and other constituents, which are useful in numerous industrial applications, such as in soaps, lubricants, inks, adhesives, and coatings.

28 Claims, 1 Drawing Sheet

ACIDIFICATION OF TALL OIL SOAP USING CARBON DIOXIDE

FIELD OF THE INVENTION

The present invention relates to the conversion of tall oil soap to tall oil.

BACKGROUND OF THE INVENTION

Coniferous woods, especially pine, contain, in addition to cellulose and hemicellulose, such components as lignin, resin acids and long-chain fatty acids. Crude tall oil, a mixture of the resin and fatty acids, is produced as a chemical by-product of the Kraft pulping process.

In the Kraft pulping process, wood chips are fed into a digester where a "white liquor" containing sodium hydroxide (NaOH) and sodium sulfide ($Na_2S$) is added. The contents are then heated according to a predetermined schedule to complete the cooking reactions, wherein the resin acids and fatty acids are released from the wood chips and saponified. The resulting cooked wood pulp is separated from the residual cooking liquor, known as "black liquor", by filtration to yield wood pulp referred to as "brown stock". The brown stock wood pulp is treated further in the papermaking process to produce papers of various grades. The sodium salts of the resin acids and fatty acids, commonly referred to as tall oil soap or "black liquor soap", are suspended in the remaining black liquor.

The recovery of various chemicals from the black liquor, the reconstitution of those chemicals to form fresh cooking liquors, the realization of energy from incineration of organic residuals, and minimization of air and water pollution, are all vital parts of the Kraft process. Among those chemicals which are recovered from the black liquor is tall oil soap. The soap is contained in the "weak" (i.e., unconcentrated) black liquor which is recovered in the pulping process as a filtrate from the separation of the pulp (brown stock).

The initial weak black liquor (at about 15% solids content) is filtered to remove fiber (brown stock) and is passed into a weak liquor skimmer. About 30% to 70% of the available black liquor soap is skimmed off. The black liquor then passes through several stages of evaporative concentration to raise the solids content to 25-30%. The black liquor then passes through a second skimmer from which the remaining 30-70% of soap is skimmed off. The black liquor finally passes through more stages of evaporative concentration to raise the solids to 65-75%. It is then fed to a recovery furnace to be burned. Burning the organic content of the black liquor provides energy for the paper making process and reconstitutes the inorganic chemicals for reuse in fresh pulping liquors. See, e.g., Foran, C. D., "Black Liquor Soap Recovery Methods Employed by Union Camp," *Naval Stores Review*, 94 (3), 14–18 (1984), the disclosures of which are incorporated by reference herein in their entirety. One skilled in the art o making Kraft paper will recognize that there are various techniques for recovering tall oil soap from the Kraft black liquor.

The separated tall oil soap is then normally acidulated with sulfuric acid ($H_2SO_4$) to form crude tall oil, which can be refined by vacuum fractionation to separate tall oil fatty acids and tall oil rosin. The fatty acids, resin acids, and their derivatives are used in numerous industrial applications, including soaps, lubricants, inks, adhesives, and coatings. The acidulation process generally comprises the addition of $H_2SO_4$ to the tall oil soap to produce crude tall oil and sodium sulfate ($Na_2SO_4$) salt cake solution. One skilled in the art will recognize that there are various acidulation processes utilizing $H_2SO_4$ for the conversion of tall oil soap to crude tall oil. For a more thorough discussion (with references), see, e.g., McSweeney, E. E., "Sulfate Naval Stores", *Naval Stores: Production, Chemistry, Utilization*, pp. 158–199, Duane Zinkel and James Russell, eds., Pulp Chemicals Association, (N.Y. 1989), the disclosures of which are incorporated by reference herein in their entirety. The $Na_2SO_4$ as described above is then recycled to the Kraft pulping process to make up for sodium and sulfur losses.

The economics of the production of crude tall oil from tall oil soap depends to a considerable degree on the ability to utilize of the salt cake from the acidulation process. Heretofore, the producer of crude tall oil would return the by-product $Na_2SO_4$ to the paper mill as make-up chemicals in the Kraft pulping process. A typical Kraft mill in the early 1970s was designed for sodium recovery of around 93% and sulfur recovery of only about 61%. See, Twiss, A. H., *Naval Stores Review*, 94 (2), 14–16 (1984), the disclosures of which are incorporated by reference herein in their entirety. With the introduction of more stringent environmental controls on the emission of air and water pollutants, a new "grass roots" state of the art mill (1984) being designed to meet the more demanding new source performance standards was predicted to achieve over 97% sodium recovery and 91% sulfur recovery. Twiss reports that as of 1984, total sodium loss expressed as equivalent salt cake had been decreased from 135 to 70 pounds/ton of pulp for a mill meeting then existing source standards, down to 53 pounds for a new state of the art (1984) mill. Total sulfur losses were decreased from 175, to 75, to 40 pounds of equivalent salt cake per ton of pulp, due mainly to reduced sulfur emissions from the recovery boiler and lime kiln. These reduced losses have had a drastic impact on the make-up sodium and sulfur requirements in the Kraft pulping process, which balance these losses. The ratio of sulfur to sodium make-up, both expressed as salt cake, declined from about 1.30 in 1970, to about 1.07 in 1984, to about 0.75 currently. This ratio is expected to decline further in the near future. The result is that paper mills no longer desire, or require, the previous levels of salt cake produced in the sulfuric acid acidulation of tall oil soap to make up for losses of sodium and sulfur. In fact, a large amount of the salt cake make-up has been replaced with more costly caustic soda to lower the sulfur make-up, and this amount is increasing. Without the paper mills to use all of the salt cake produced by the acidulation of tall oil soap, the remainder has to be sewered. However, the organic contaminants in a sewer discharge containing salt cake serves to increase the biological oxygen demand (BOD) levels in the water treatment system receiving the discharge. There are, therefore, practical limitations on the discharge of salt cake to the sewer. These limitations are bound to increase due to increasingly stringent environmental restrictions.

A number of other authors have also discussed tall oil soap acidulation and sulfur balance problems in Kraft mills. See, e.g., Wong, A., *Naval Stores Review*, 94 (3), 8–10 (1984), the disclosures of which are incorporated by reference herein in their entirety. Wong reported the same problems associated with the salt cake from the acidulation of the tall oil soap as did Twiss. Wong proposed the replacement of $H_2SO_4$ used in soap acidulation with chlorine dioxide generator effluent to lower the sulfur input into the mill liquor system. However, the reduced sulfur input would still be higher than the losses in the mill by about 10%.

It has been suggested that the tall oil acidulation process can be modified to reduce or eliminate by-product sulfur by the use of other common acids, such as hydrochloric. The use of such acids, however, would prohibit recovery of the spent acid due to build-up of extraneous anions and problems in tall oil purification.

Electrolysis of spent acid to NaOH and a mixture of $H_2SO_4$ and $Na_2SO_4$ has also been investigated.

As also reported by Twiss, at p. 16, replacement of about one-half of the $H_2SO_4$ with carbon dioxide has been described by Bills, U. S. Pat. No. 3,901,869 (1975), the disclosures of which are incorporated by reference herein in their entirety. Specifically, Bills describes the acidification of tall oil soap using a water to soap weight ratio between 0.75 and 2.00, a temperature between ambient and 120° F. (49° C.), and sufficient carbon dioxide to lower the pH to between 7-8. In accordance with Bills, the product separated into an upper layer containing tall oil acids and unreacted soaps, and a lower layer containing aqueous sodium bicarbonate. To complete the recovery of tall oil acids, the upper layer required further reaction with 0.0974 to 0.150 pounds of $H_2SO_4$ per pound of crude tall oil. The Bills process resulted in only a 40-53% reduction in the amount of $H_2SO_4$ needed to complete the conversion to tall oil soap using a single stage $CO_2$ process. Thus, Bills also proposed a two-stage process, in which the previously carbonated soap-acid layer is then mixed with an equivalent amount of fresh water and acidified again with $CO_2$. The two-step process described by Bills, however, has the disadvantage of necessitating, as Bills pointed out, "an increase in the use of water which would add greatly to the evaporation load".

Vardell, Jr., U.S. Pat. No. 4,075,188 (1978) describes a somewhat improved carbon dioxide acidification reaction using a water-immiscible solvent. The best example showed that only 60% of the tall oil salts were converted to free acids in a single stage reaction using carbon dioxide at 500 psig, 150° C., and a 1.0 to 0.33 to 0.67 weight ratio of soap to water to solvent. It should also be noted that the use of a solvent, as taught by Vardell, Jr., itself poses additional environmental concerns.

These proposed solutions only partially address the problem. Very simply, the most effective and efficient processes for acidulation of tall oil soap to crude tall oil disclosed to date involve the use of large amounts of $H_2SO_4$ as the sole acidulation agent. This, however, results in far too much $Na_2SO_4$ being produced in soap acidulation plants for convenient recycling in the paper mill liquor system, or for environmentally safe and economical disposal.

There is a long felt need in the papermaking industry for a process to acidulate tall oil soap to form crude tall oil which can significantly reduce the formation of $Na_2SO_4$ salt cake. This need has not been satisfied to date, even in the face of a compelling urgency caused by more stringent environmental emission controls and reduced requirements for salt cake in the paper mills.

The present invention relates to a process for the acidulation of tall oil soap to form crude tall oil which reduces the use of $H_2SO_4$ in the acidulation process. These and other objects of the present invention will become readily apparent from the subject specification.

SUMMARY OF THE INVENTION

In accordance with the present invention, crude tall oil can be conveniently prepared from tall oil soap without the use of large amounts of $H_2SO_4$. The present process may be carried out by first contacting an aqueous tall oil soap solution with carbon dioxide, under pressure, to form an emulsion comprising crude tall oil and sodium bicarbonate brine. The crude tall oil and sodium bicarbonate brine is then allowed to separate, under pressure, into a layer comprising crude tall oil and a layer comprising sodium bicarbonate brine. The crude tall oil layer may then be recovered easily, under pressure, from the sodium bicarbonate brine layer, and put to various uses.

By employing the foregoing process, one is able to effectively produce, at a high rate of conversion, crude tall oil, a product of extreme importance to a number of industries, while at the same time minimizing the amount of $H_2SO_4$ used and $Na_2SO_4$ produced and the environmental concern associated with these sulfur-containing compounds.

DETAILED DESCRIPTION OF THE INVENTION

Figure 1:
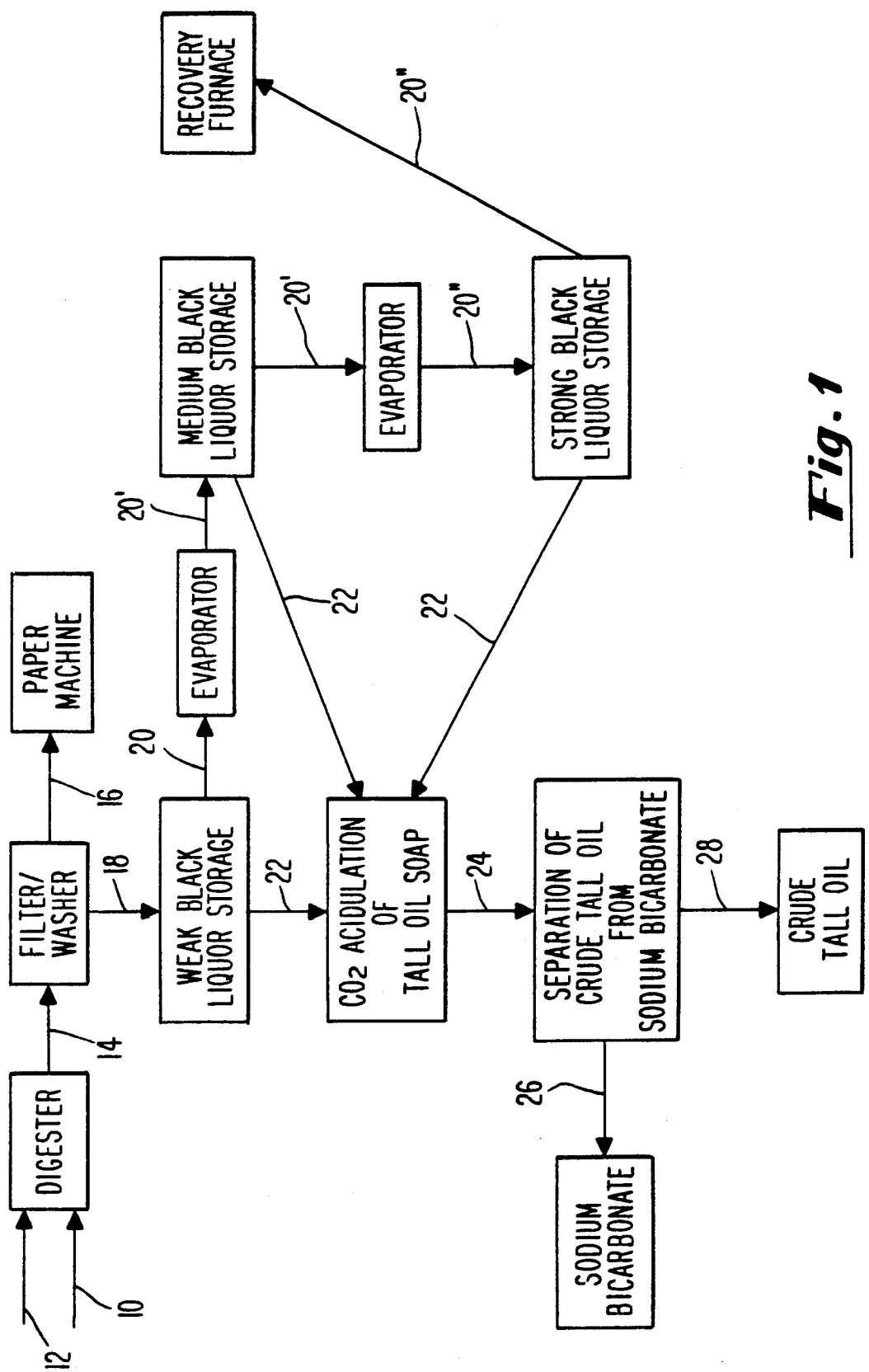
FIG. 1 is a schematic flow diagram of Kraft pulping and crude tall oil recovery systems utilizing the present invention.

Coniferous woods, particularly pine, comprise, in addition to cellulose and hemicellulose, resin acids in the free acid form, long-chain fatty acids primarily in the form of glycerides, and lignin. Resin acids are monocarboxylic diterpene acids commonly having the molecular formula $C_{20}H_{30}O_2$. Among those resin acids present are abietic, levopimaric, neoabietic, palustric, dehydroabietic, isopimaric, sandaracopimaric, pimaric, and secodehydroabietic acid. The fatty acids found in the coniferous woods are typically $C_{16}$-$C_{18}$ saturated or unsaturated fatty acids, including palmitic, stearic, palmitoleic, oleic and linoleic. Lignin is a phenylpropane polymer of amorphous structure which acts more or less as a plastic binder for the holocellulose fibers.

Referring to FIG. 1, in a Kraft pulping process, wood chips 10 comprising the resin acids, long-chain fatty acids, and lignin, and white liquor 12 comprising NaOH and $Na_2S$ are added to a digester and heated according to a predetermined schedule of temperature and time to dissolve a significant portion of the lignin in the cooking liquor. During the cooking process, the fatty acid glycerides and the resin acids are saponified by the alkaline cooking liquor, thereby forming sodium salts of those acids. The resulting salts, commonly referred to as "black liquor soap" or "tall oil soap", are suspended in the cooking liquor, which is now called "black liquor", along with lignin and carbohydrate degradation products.

The cooked pulp and black liquor (collectively 14) are passed to a brown stock filter/washer, where the cooked pulp 16 ("brown stock") is separated from the black liquor 18, and then washed and carried forward to the papermill for processing into various grades of paper. The black liquor 18, known as weak (unconcentrated) black liquor, which contains dissolved tall oil soap and lignin, is placed in a weak black liquor storage facility wherein the tall oil soap 22 is separated from the black liquor by conventional methods discussed previously herein. The weak black liquor 20, is then concentrated in a series of evaporators where more tall oil soap 22 is recovered, and the weak black liquor is transformed first by evaporation into medium black liquor, and then with more evaporation into strong black liquor 20''. After final evaporation, the strong black liquor 20'' is then placed in a strong black liquor storage facility. The strong black liquor 20'' may be forwarded, as desired, to the recovery furnace where the organic portion is burned to produce heat to raise steam, and the inorganic chemicals are reconstituted as molten $Na_2S$ and $Na_2CO_3$.

According to the process of the present invention, the tall oil soap 22 is then acidulated (acidified), under pressure, by contacting the tall oil soap with carbon dioxide ($CO_2$) to form an emulsion 24 comprising crude tall oil and sodium bicarbonate. This acidification reaction proceeds as follows:

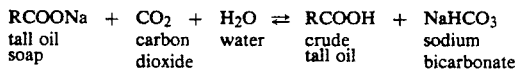

$$RCOONa + CO_2 + H_2O \rightleftharpoons RCOOH + NaHCO_3$$
tall oil soap / carbon dioxide / water / crude tall oil / sodium bicarbonate Following acidulation of the tall Oil soap With $CO_2$, the crude tall oil (RCOOH) 28 is then separated from the emulsion 24 by allowing the crude tall oil 28 and sodium bicarbonate 26 to separate, under pressure, into a layer (generally an upper layer) comprising crude tall oil (and any unreacted tall oil soap), and a layer (generally a lower layer) comprising aqueous sodium bicarbonate (also referred to as sodium bicarbonate brine). If desired, the acidulation may be conducted such that the amount of sodium bicarbonate produced exceeds the solubility limits of the sodium bicarbonate brine layer to provide solid sodium bicarbonate salt for other uses. One skilled in the art will appreciate that the solubility limits of the sodium bicarbonate brine layer will be affected by parameters such as, for example, temperature and pressure. The crude tall oil layer 28 and the sodium bicarbonate brine layer 26 can then be recovered and used in various fashions.

The present invention provides crude tall oil at high rates of conversion, reducing or avoiding the need to acidify any remaining tall oil soap using $H_2SO_4$. Typically, the rate of conversion of tall oil soap to crude tall oil is greater than about 60%, preferably greater than about 65%, more preferably greater than about 70%, even more preferably greater than about 80%, still more preferably greater than about 90%, and most preferably greater than about 95%. Indeed, not only does the subject process provide a high rate of conversion to the very important crude tall oil, but the subject process also has an ecological benefit by reducing or eliminating the use of $H_2SO_4$ with its concomitant production of $Na_2SO_4$.

To achieve the desired high conversion to crude tall oil, the acidification ($CO_2$ addition) and the separation (layer formation) and removal steps of the subject process should be carried out under pressure, that is, at a pressure greater than atmospheric pressure (greater than 14.7 psi). Indeed, it has been surprisingly found that where pressure is not applied during layer formation, a significant reversal of the acidification reaction occurs, thus reducing the conversion to crude tall oil, and increasing any subsequent $H_2SO_4$ requirement. Neither Bills, U.S. Pat. No. 3,901,869 nor Vardell, Jr., U.S. Pat. No. 4,075,188 recognized the importance of the pressure parameter. To the contrary, Vardell, Jr., while using a very high pressure of 500 psig in the acidification step, taught the release of pressure prior to phase separation, as shown, for example, in column 4, lines 54-58, and column 5, lines 6-10, and 41-45 of that patent. Similarly, Bills notes, in column 3, lines 48-49 of that patent, that the process proceeds satisfactorily at atmospheric pressure, and in column 4, lines 57-59, Bills teaches the removal of the reaction mixture from the reaction vessel and layer separation in a basic 5-gallon can (i.e., without pressure), again teaching away from the present invention.

Thus, in accordance with the subject invention, in the acidification step, the aqueous tall oil soap solution is contacted with carbon dioxide under pressure, to form a crude tall oil and sodium bicarbonate brine emulsion. In the separation step, the crude tall oil and sodium bicarbonate brine emulsion is then allowed to separate, still under pressure, into a layer (or phase) comprising substantially crude tall oil and a layer (or phase) comprising substantially sodium bicarbonate brine. Preferable pressures include, for example, between about 50 and about 800 psig, more preferably between about 100 psig and 300 psig, even more preferably between about 150 psig and about 250 psig, and most preferably at about 250 psig, although higher or lower pressures may be employed, as desired. Although higher pressures provide generally higher conversion, the higher pressures often require costlier equipment, and, accordingly, are not preferred. The pressures in the acidification, separation and removal steps may be the same or different, as desired.

If desired, a solvent may be employed in the process of the invention, although, contrary to the teachings of Vardell, Jr., preferably the process is carried out in the absence of a solvent. The use of solvents in the subject process generally poses economical concerns due to additional initial reagent costs and solvent evaporation losses, as well as environmental concerns. If a solvent is employed, however, preferably, the solvent is a non-polar solvent, more preferably an aliphatic hydrocarbon solvent, or mixtures thereof. Preferable solvents include mineral spirits, preferably Mineral Spirits 66/3 (available from the Unocal Chemicals Division of the Union Oil Company of California, Schaumburg, Ill.) having a boiling point range of 318°-383° F., a health hazard rating of 1 (slight), a flammability rating of 2 (moderate), and a flash point of 107° F. Other preferable solvents include kerosene (having a boiling point range of 400°-500° F.), cetane (having a boiling point range of about 550° F. and a vapor pressure of less than 1 mm at 220° F.), and/or naphtha. A most preferred solvent is kerosene or naphtha. The amount of solvent to be added to the tall oil soap will depend to some extent, as those skilled in the art will recognize, on the particular solvent employed. The upper limit on the amount of solvent used is generally dictated by practical operating and cost considerations. Preferably, the solvent to tall oil soap ratio is between about 0.5 to 1 and about 2 to 1.

The process may be carried out at varying temperatures. Nonetheless, certain temperature effects have been noted. Specifically, it has been observed that increased temperature (at constant pressure) decreases the liquid concentration of the carbon dioxide, limiting the conversion of the acidulation reaction. It has also been observed that increased temperature reduces the viscosity of the oil layer (at constant conversion), improving phase separation. Further, it has been observed that decreased temperature reduces the aqueous solubility of sodium bicarbonate, driving the reaction to higher than expected conversions at low water to soap ratios. As those skilled in the art will recognize, the first two temperature effects create somewhat of a trade-off for non-solvent reactions, since both conversion and phase separation are needed to reduce the $H_2SO_4$ requirement. These effects are, however, somewhat skewed toward higher temperatures, such as above about 80° C. and about 85° C. The third temperature effect is most useful when a solvent limits the organic viscosity at low temperature.

With the foregoing in mind generally preferable temperature ranges for the process of the invention include a range of between about 50° C. and about 125° C., more preferably between about 65° C. to about 85° C., most preferably at about 75° C., although temperatures below about 50° C. and above about 125° C. may also be employed. The temperature in the acidification, separation and removal steps may be the same or different, as desired. In one preferable embodiment, the acidification step is carried out at temperatures within the lower end of this range, that is, at about 50° C., and layer separation is carried out at the higher end of this temperature range, that is, between about 75° C. and about 85° C.

The tall oil soap employed in the present process may be in aqueous form. The water to tall oil soap ratio of the aqueous tall oil soap is preferably between about 0.5 to 1, and about 2 to 1, although higher or lower ratios may be used. Bills noted that when water less than about 0.75 to 1 (water to tall oil soap) is present, the viscosity of the reaction mixture becomes too high to allow separation into a crude tall oil and sodium bicarbonate layer. Contrary to the teachings of Bills, however, a 0.5 to 1 water to soap ratio may, for example, be employed, and may result, when the process of the invention is carried out at 100 psig $CO_2$ and 75° C. for all steps, in a 55% reduction in $H_2SO_4$ consumption with a minimum amount of water evaporation costs. As a general matter, it should be noted that when significantly more water than about 2 to 1 (water to tall oil soap) is present, the additional water results in increased volumes of material which significantly raise evaporation costs, and is most preferably avoided. One preferable ratio that satisfies both the viscosity and volume concerns is a ratio of about 0.75 to less than 1.25, although higher or lower ratios may be employed.

As one general example, a combination of water, solvent and tall oil soap, in equal weight amounts, may achieve conversions of above 90% in a single stage, when all steps are carried out under pressure.

The carbon dioxide employed in the subject invention may be in any form, for example, liquid, solid or gaseous, although preferably gaseous or liquid carbon dioxide is used. While Bills teaches that the carbon dioxide is added as a stoichiometric equivalent of the tall oil soap and its entrained black liquor solids, it has been found that better performance can be obtained with excess carbon dioxide required to achieve the desired pressure. When employing liquid or solid carbon dioxide, a heat exchanger should be employed to provide heating of the carbon dioxide. Flashing of part of the $CO_2$ liquid or solid to the gas will accelerate the reaction by providing vigorous mixing.

For the best results, it is preferable to add any water and/or solvent to the tall oil soap prior to contacting the tall oil soap with $CO_2$. It is also preferable to carry out the $CO_2$ acidulation step with vigorous mixing to prevent the formation of a viscous gel that otherwise forms in batch experiments. In continuous operation, intermediate gel formation can be circumvented with the use of a stirred tank reactor (instead of a plug flow reactor), although a plug flow reactor with proper agitation can be used. The reaction generally run to completion in about 15 minutes to an hour. Conversion is generally increased through counter-current or cross-current multi-stage processing.

The present invention provides crude tall oil at high rates of conversion, minimizing or avoiding the need to acidify any remaining tall oil soap using $H_2SO_4$. Not only is a high conversion to the very important crude tall oil obtained, but the subject process also has an ecological benefit by reducing or eliminating the use of $H_2SO_4$ and the concomitant production of $Na_2SO_4$.

After the $CO_2$ acidulation step, the emulsion is allowed to separate, under pressure, into an aqueous phase (generally a lower layer) comprising sodium bicarbonate and an organic phase (generally an upper layer) comprising crude tall oil. A those skilled in the art will recognize, the sodium bicarbonate layer may also contain some other components, such as sodium lignate salts entering the process with the soap as black liquor entrainments. Similarly, the crude tall oil layer may contain some additional components, such as some unacidified tall oil soap and some unseparated bicarbonate brine. Separation may be carried out using conventional means such as by gravity separation, centrifugation, coalescation and/or other means as will be readily apparent to those skilled in the art once armed with the present disclosure. One particularly useful centrifuge device is the Podbielniak Centrifugal Contactor, manufactured by APV Machinery, Inc., Saginaw, Mich.

The crude tall oil may then be removed for further processing to produce tall oil fatty acids and tall oil resins. Removal may be carried out by conventional means such as decanting or the like. The aqueous phase optionally may be recycled and combined with tall oil soap, in addition to any necessary make-up water to form the tall oil soap feed mixture. If the tall oil soap is not completely acidulated (that is, contains some unacidified tall oil soap), the partially acidulated tall oil soap may be transported to a further reactor and the $CO_2$ acidulation process of the invention carried out again, as described above. Alternately, if desired, any residual soap in the crude tall oil layer may be converted to crude tall oil using $H_2SO_4$, or other strong acids. Even if $H_2SO_4$ is employed in the acidulation of any remaining tall oil soap, the present invention typically provides a sufficiently high rate of conversion that the amount of $H_2SO_4$ employed is reduced by greater than about 60%, preferably greater than about 65%, more preferably greater than about 70%, even more preferably greater than about 80%, still more preferably greater than about 90%, and most preferably greater than about 95%, over processes employing $H_2SO_4$ as the sole acidulation agent.

As will be recognized by one of ordinary skill the art, the number and design of any reactors and separators will be determined by various factors, and the embodiments previously discussed are by no means intended to limit the scope and spirit of the present invention.

Acidulation of tall oil soap using carbon dioxide to crude tall oil in accordance with the present invention has, as one significant advantage over the prior $H_2SO_4$ acidulation processes, the fact that $Na_2SO_4$ production is minimized or avoided. The present invention thus addresses the long felt need in the papermaking industry to reduce sulfur emissions. Indeed, the present invention provides an improved method for the production of crude tall oil from tall oil soap without producing (or with a minimum production of) $Na_2SO_4$ salt cake, the disposal of which cake is becoming more and more of a serious problem in the papermaking industry. The invention eliminates both the problems of the crude tall oil producers losing the credit value for the cake, which heretofore has been returned to the pulp mill, and the problems of disposing of the cake if the pulp mill will not accept it.

The present invention is further described in the following examples. These examples are not to be construed as limiting the scope of the appended claims.

EXAMPLE 1

A one-gallon autoclave was charged with 1030 g of tall oil soap and 1030 g of water. With the agitation off, the reactor headspace was purged three times with 100 psig $CO_2$. The charge was then stirred vigorously, and heated to 46° C. During the 15 minute heat-up period, gaseous carbon dioxide was bubbled into the mixture until the headspace reached 100 psig. The reaction mixture was stirred for an additional 60 minutes at 46° C., with additional $CO_2$ injected as needed to maintain 100 psig.

After the stirring was discontinued, the reaction mixture was allowed to separate and settle for three days at constant temperature (46° C.) and pressure (100 psig). A sample was then collected from the expected midpoint of the upper layer and the reactor contents were discharged. The results revealed that the $H_2SO_4$ savings reached 67%, a savings significantly greater than any reported in Bills.

EXAMPLE 2

The reactor was charged with 1254 g of tall oil soap and 1252 g of water. The charge was heated to 46° C. with vigorous agitation, and reacted with $CO_2$ for three hours at 300 psig. After two hours of settling at constant temperature (46° C.) and pressure (300 psig), a sample was collected from the expected midpoint of the upper layer. Upon centrifuging, the sample separated into organic and aqueous layers, demonstrating that the oil and brine had not completely separated within the pressure reactor. Results of the centrifuged organic layer indicated a 68% $H_2SO_4$ reduction. Similar results were obtained after two more days of settling.

The settling temperature was then increased to 80° C., without agitation or additional $CO_2$ injection. The mixture was allowed to settle overnight, and another sample was collected from the expected midpoint of the upper layer. After centrifuging, this sample gave no visible separation of bicarbonate brine, suggesting that separation had been completed within the pressure reactor. Subsequent analysis confirmed that about 99% of the bicarbonate brine had been removed from the oil. Results of the centrifuged organic layer indicated an 82% reduction in the amount of $H_2SO_4$ needed to complete the acidulation.

The organic layer had an acid number of 126 and a soap number of 35, indicating a 78% tall oil conversion. The $H_2SO_4$ savings are higher than the tall oil conversion because $CO_2$ acidulation also neutralizes black liquor solids (such as excess sodium hydroxide), that would otherwise consume $H_2SO_4$.

EXAMPLE 3

Additional batch tests were conducted in either a one-gallon lab reactor or a twenty-gallon pilot plant vessel. Results from these tests are summarized in Table I. The water/soap/solvent ratios are all expressed on a weight basis. The temperature and pressure shown were kept constant throughout both the reaction and phase separation.

Example 3A shows that very short settling times are possible if both the reaction and phase separation occur at an elevated temperature. As will be recognized by those skilled in the art, the extent and speed of phase separation may be further enhanced by conventional means such as centrifugal devices or coalescers. Nonetheless, this test contrasts with the teachings of Bills, U.S. Pat. No. 3,901,869 (1975), which reports that above 50° C. (120° F.), "the resulting acidified soap was a smooth emulsion which would not break". See Bills, col. 3, lines 10–12.

Example 3B shows the benefits of increased $CO_2$ pressure. Increased pressure shifts the reaction equilibrium to a higher conversion, thus reducing the amount of $H_2SO_4$ needed to complete the acidification. The oil-brine separation also improves at higher conversions, reducing the amount of $H_2SO_4$ consumed by entrained sodium bicarbonate. About 93% of the bicarbonate brine was removed from the oil under pressure in Example 3B, compared with 89% in Example 3A.

Example 3C demonstrates that evaporation costs can be reduced by operating at a 0.5:1 water:soap ratio. In contrast, Bills, U.S. Pat. No. 3,901,869 (1975), teaches that "below the 3/4:1 water to soap ratio, the viscosity of the mixture becomes too high, thus preventing it from separating into bicarbonate brine and soap-acid layers". See Bills, col. 3, lines 27–30.

Example 3D extends the benefits of pressure separation to acidulation with a water-immiscible solvent. In this case the solvent was petroleum naphtha. The 94% $H_2SO_4$ reduction is substantially higher than any single-stage results reported by Vardell, Jr., U.S. Pat. No. 4,075,188 (1978), and even rivals the results reported by Vardell, Jr. after three consecutive acidifications. Thus the pressure separation saves both $H_2SO_4$ and process complexity. After washing the solvent layer with fresh water at ambient temperature and pressure, the $H_2SO_4$ reduction improved to 97%.

TABLE I

| | ADDITIONAL BATCH ACIDULATION RESULTS | | | | | |
|---|---|---|---|---|---|---|
| EXAMPLE | WATER/SOAP/ SOLVENT RATIO | °C. | PSIG | REACTION TIME IN MINUTES | SETTLING TIME IN MINUTES | % REDUCTION IN $H_2SO_4$ |
| 3A | 1/1/0 | 75 | 150 | 150 | 15 | 67% |
| 3B | 1/1/0 | 75 | 250 | 60 | 15 | 74% |
| 3C | 0.5/1/0 | 75 | 100 | 60 | 120 | 55% |
| 3D | 1/1/1 | 46 | 300 | 120 | 120 | 94% |

EXAMPLE 4

Continuous operation was demonstrated with an aqueous soap solution at a 1:1 water:soap ratio. This feed was continuously pumped into a 20 gal agitated pilot plant reactor at 2 lb/min. $CO_2$ was injected into the reactor to maintain a headspace pressure of 150 psig. A total of 3265 lb of soap solution were processed, using 114 lb of gaseous $CO_2$. The reactor operated at 75° C., with a hold-up of about 120 lb, and an agitation speed of 250 rpm.

To maintain a constant reactor hold-up, the reaction mixture was continuously pumped into a 50-gallon decanter. The decanter also operated at 75° C. and 150 psig, with a total liquid hold-up of about 360 lb. The reaction mixture was injected just below the interface, which was maintained near the center of the decanter by a thermal conductivity detector. Oil and brine were intermittently withdrawn from the top and bottom of the decanter, respectively.

Oil and brine leaving the two ends of the decanter were discharged into separate 55-gallon drums, which also served as de-pressurization vessels. A total of 1092 lb of organic layer was recovered, along with 2149 lb of bicarbonate brine. Overall $H_2SO_4$ savings were 69%, a substantial improvement over the 40-43% reported in Bills' continuous acidulations.

EXAMPLE 5

The pilot plant reactor was charged with about 140 lb of aqueous soap solution at a 1:1 water:soap ratio. The charge was reacted with $CO_2$ for about 30 minutes at 85° C. and 300 psig. After two hours of phase separation at constant temperature and pressure, about 100 lb of bicarbonate brine was drained from the bottom of the reactor. An equal amount of fresh water was added to the reactor charge, and the mixture was again reacted with $CO_2$ for about 30 minutes at 85° C. and 300 psig. After another two hour period of pressure separation, the brine was again drained from the bottom of the reactor and replaced with fresh water. The procedure was repeated a third time, although in this case the settling continued overnight. Two more cross-current stages of reaction and separation were conducted the next day, with settling times of two hours and overnight, respectively. A small sample of the upper layer was collected at the end of each settling period, just prior to draining the brine from the reactor. Table II summarizes the results from these samples:

TABLE II

| | MULTI-STAGE $CO_2$ ACIDULATION | |
|---|---|---|
| STAGE # | SETTLING TIME IN HOURS | % REDUCTION IN $H_2SO_4$ |
| 1 | 2 | 80% |
| 2 | 2 | 93% |
| 3 | 12 | 97% |
| 4 | 2 | 98% |
| 5 | 16 | 99% |

Those skilled in the art will appreciate that various changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A process for preparing crude tall oil from tall oil soap, comprising:
    contacting an aqueous tall oil soap solution with carbon dioxide, under a pressure of between about 50 and about 800 psig, to form crude tall oil and sodium bicarbonate; and
    allowing said crude tall oil and said sodium bicarbonate to separate, under a pressure of between about 50 and about 800 psig, into a layer comprising crude tall oil and a layer comprising sodium bicarbonate.

2. A process of claim 1, wherein said contacting pressure is between about 100 and about 300 psig.

3. A process of claim 2, wherein said contacting pressure is about 250 psig.

4. A process of claim 1 wherein said separation pressure is between about 100 and about 300 psig.

5. A process of claim 4 wherein said separation pressure is about 250 psig.

6. A process of claim 1 wherein said carbon dioxide is a gas.

7. A process of claim 1 wherein said carbon dioxide is a liquid.

8. A process of claim 1 wherein said aqueous tall oil soap solution is contacted with carbon dioxide in the absence of a solvent.

9. A process of claim 1 wherein said aqueous tall oil soap solution is contacted with carbon dioxide in the presence of a solvent.

10. A process of claim 9 wherein said solvent is a non-polar solvent.

11. A process of claim 10 wherein said non-polar solvent is an aliphatic hydrocarbon solvent.

12. A process of claim 11 wherein said aliphatic hydrocarbon solvent is selected from the group consisting of naphtha and kerosene.

13. A process of claim 1 wherein said process is carried out at a temperature of between about 50° C. and about 125° C.

14. A process of claim 13 wherein said process is carried out at a temperature between about 65° C. and about 85° C.

15. A process of claim 1 wherein said aqueous tall oil soap solution is contacted with carbon dioxide at a temperature of about 50° C., and wherein said crude tall oil and sodium bicarbonate are separated into said crude tall oil layer and said sodium bicarbonate layer at a temperature of between about 75° C. and about 85° C.

16. A process of claim 1 wherein the ratio of water to tall oil soap is between about 0.5 to 1 and about 2 to 1.

17. A process of claim 16 wherein the ratio of water to tall oil soap is about 1 to 1.

18. A process of claim 1 wherein the process is carried out for at least about 15 minutes.

19. A process of claim 1 wherein conversion of tall oil soap to crude tall oil is at least about 65%.

20. A process of claim 1 wherein conversion of tall oil soap to crude tall oil is at least about 80%.

21. A process of claim 1 wherein conversion of tall oil soap to crude tall oil is at least about 95%.

22. A process of claim 1 wherein said sodium bicarbonate is produced in amounts which exceed the solubility limits of said sodium bicarbonate layer to provide solid sodium bicarbonate.

23. A process for preparing crude tall oil from tall oil soap, comprising:

(i) contacting an aqueous tall oil soap solution with carbon dioxide, under a pressure of between about 50 and 300 psig, to form crude tall oil and sodium bicarbonate;

(ii) allowing said crude tall oil and said sodium bicarbonate to separate, under a pressure of between about 50 and 800 psig, into a layer comprising a crude tall oil and a layer comprising sodium bicarbonate; and (iii) removing said crude tall oil layer from said bicarbonate layer, under a pressure of between about 50 and 800 psig.

24. A process of claim we further comprising (iv) adding water to said removed crude tall oil layer, (v) contacting said aqueous crude tall oil solution with carbon dioxide, under a pressure of between about 50 and 800 psig, into a layer comprising crude tall oil and a layer comprising sodium bicarbonate; and (vii) removing said crude tall oil layer from said bicarbonate layer, under a pressure of between about 50 and 800 psig.

25. A process of claim 24 further comprising repeating steps (iv) through (vii) at least one additional time.

26. A process of claim 22 wherein conversion of tall oil soap to crude tall oil is at least about 65%.

27. A process of claim 22 wherein conversion of tall oil soap to crude tall oil is at least about 80%.

28. A process of claim 22 wherein conversion of tall oil soap to crude tall oil is at least about 95%.

* * * * *